UNITED STATES PATENT OFFICE.

GUSTAV GUMBEL, OF STRASBURG, GERMANY.

COMPOUND FOR WATERPROOFING OIL-RECEPTACLES.

SPECIFICATION forming part of Letters Patent No. 491,284, dated February 7, 1893.

Application filed June 17, 1892. Serial No. 437,095. (No specimens.)

*To all whom it may concern:*

Be it known that I, GUSTAV GUMBEL, a subject of the Emperor of Germany, residing at Strasburg, Germany, have invented certain Improvements in Compounds for Waterproofing Oil-Receptacles and the Like and Their Manufacture, of which the following is a specification.

My invention has reference to improvements in the manufacture of waterproofing compounds for liquid receptacles, and particularly for kerosene oil and other hydrocarbon oils, which are very liable to permeate ordinary receptacles, and the object of my invention is provide a compound of this character which shall obviate the disadvantages attendant on the use of such compounds as are ordinarily employed for the purpose.

It is well known that the compounds ordinarily employed for waterproofing oil receptacles become after a time, brittle and friable from contact with the oil, and the waterproof coat is then extremely liable to crack off when the receptacle receives a smart blow or jar. My improved compound however has no such disadvantageous quality, and, when spread over the inner surface of the receptacle forms an elastic impervious coating or film which remains soft and plastic, so that it will not crack or scale off.

In carrying out my invention I take the waste liquor from the manufacture of sulphite cellulose and concentrate it to about 25°, Baumé. I then mix with this concentrated liquor boiling glue, gluten or an albuminous substance in about the proportion of seventy parts of the liquor to five parts of glue. To this mixture is then added about twenty-five parts of hydraulic lime, cement or other alkaline earth. This mixture is then poured into the receptacle to be rendered waterproof, and is spread evenly over the entire inner surface thereof, so as to form a coating or film of uniform thickness. This may be done by turning the receptacle about so that the mixture will flow over the surface or by other means. The layer which adheres to the receptacle will dry in a few hours after which the receptacle may be filled with the oil.

The waste liquor is obtained by concentrating the lye resulting from the boiling of wood, preferably pine, with an aqueous solution of sulphite of lime or caustic soda, which lye dissolves the resins from the wood during the boiling under pressure. The glue, gluten or albuminous substance combines partly with the resins contained in the waste liquor and form compounds insoluble in water; the chemical nature of these compounds as far as I am aware, has not been definitely ascertained.

I do not wish to be understood as limiting myself to the employment of the several ingredients in the exact proportions given, as this is not essential to my invention, but I believe these proportions to be the best adapted to good results. Nor do I wish to be understood as limiting myself to the actual ingredients themselves, as equivalents of the same may be employed; for example any equivalent of glue may be employed without departing from my invention.

Having thus described my invention, I claim:—

1. The herein described composition of matter, which consists of the waste liquor from the manufacture of sulphite cellulose, glue, and an alkaline earth, in substantially the proportions set forth.

2. The herein described composition of matter, which consists of the waste liquor from the manufacture of sulphite cellulose, glue, and hydraulic lime, all in substantially the proportion set forth.

3. The herein described process of preparing a compound for waterproofing oil receptacles, which consists in concentrating the waste liquor from the manufacture of sulphite cellulose to about 25° Baumé, then adding glue, to said concentrated liquor and then adding to said mixture hydraulic lime, all substantially in the proportion set forth.

4. The herein described process of preparing a compound for waterproofing oil receptacles, which consists in first concentrating the waste liquor from the manufacture of sulphite cellulose to about 25° Baumé, then mixing with this liquor boiling glue, in about the proportion of seventy parts of the liquor to five parts of the glue, and then adding to this mixture about twenty-five parts of hydraulic lime, substantially as set forth.

In testimony whereof I have signed my name to this specification in the presence of two subscribing witnesses.

GUSTAV GUMBEL.

Witnesses:
FRIEDRICH NIESS,
ERNEST THROWS.